(12) United States Patent
Yeh et al.

(10) Patent No.: US 9,372,512 B2
(45) Date of Patent: Jun. 21, 2016

(54) PORTABLE ELECTRONIC DEVICE

(71) Applicant: COMPAL ELECTRONICS, INC., Taipei (TW)

(72) Inventors: Yao-Tsung Yeh, Taipei (TW); Kun-Hsin Liu, Taipei (TW); Shih-Chin Chou, Taipei (TW); Chun-Huang Yu, Taipei (TW); Hong-Tien Wang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 14/252,793

(22) Filed: Apr. 15, 2014

(65) Prior Publication Data

US 2015/0185786 A1 Jul. 2, 2015

(30) Foreign Application Priority Data

Jan. 2, 2014 (TW) .............................. 103100084 A (51) Int. Cl.
 *G06F 1/16* (2006.01)
 *F16M 11/10* (2006.01)
 *F16M 11/38* (2006.01)

(52) U.S. Cl.
 CPC ............. *G06F 1/1675* (2013.01); *F16M 11/10* (2013.01); *F16M 11/38* (2013.01); *F16M 2200/063* (2013.01)

(58) Field of Classification Search
 CPC ..... G06F 1/162; G06F 1/1624; G06F 1/1615; G06F 1/1616; G06F 1/1618; G06F 1/1675; G06F 1/1677; G06F 1/1681; F16M 11/10; F16M 11/38; F16M 2200/063
 USPC ......... 361/679.27, 679.02; 248/346.01–346.5
 See application file for complete search history.

(56) References Cited

U.S. PATENT DOCUMENTS

| | | | |
|---|---|---|---|
| 5,168,426 A * | 12/1992 | Hoving et al. ........... | 361/679.09 |
| 5,494,447 A | 2/1996 | Zaidan | |
| 6,532,147 B1 | 3/2003 | Christ, Jr. | |
| 7,239,505 B2 * | 7/2007 | Keely et al. ............. | 361/679.09 |
| 8,687,355 B2 * | 4/2014 | Hsu et al. ................. | 361/679.27 |
| 8,995,117 B1 * | 3/2015 | Hayashida et al. ...... | 361/679.27 |
| 9,277,659 B2 * | 3/2016 | Onda .................... | H05K 5/0217 |
| 2005/0138775 A1 * | 6/2005 | Oakley ................. | G06F 1/1681 |
| | | | 16/368 |

(Continued)

FOREIGN PATENT DOCUMENTS

| | | |
|---|---|---|
| CN | 2739686 Y | 11/2005 |
| CN | 201022208 Y | 2/2008 |

(Continued)

*Primary Examiner* — Hoa C Nguyen
*Assistant Examiner* — Christopher L Augustin
(74) *Attorney, Agent, or Firm* — CKC & Partners Co., Ltd.

(57) ABSTRACT

A portable electronic device includes a cover, a main body, a first bracket, a second bracket and a rotary shaft. The main body includes a top surface, a bottom surface opposite to the top surface, and a guiding groove disposed on the top surface. One end of the first bracket pivots to the cover, and the other of the first bracket is slidable in the guiding groove. One end of the second bracket pivots to the cover. The rotary shaft pivots to the other of the second bracket and the main body to allow the second bracket to rotate about an axis of rotation relative to the main body. An orthographic projection of the guiding groove on the bottom surface of the main body and an orthographic projection of the rotary shaft on the bottom surface of the main body are overlapped with each other.

14 Claims, 10 Drawing Sheets

(56) References Cited

U.S. PATENT DOCUMENTS

| | | | |
|---|---|---|---|
| 2010/0214743 A1* | 8/2010 | Huang | G06F 1/1616 361/692 |
| 2011/0157799 A1 | 6/2011 | Harmon et al. | |
| 2013/0044413 A1* | 2/2013 | Cheng | G06F 1/1616 361/679.01 |
| 2013/0061700 A1 | 3/2013 | Mitsui et al. | |
| 2015/0002998 A1* | 1/2015 | Arima et al. | 361/679.27 |

FOREIGN PATENT DOCUMENTS

| | | |
|---|---|---|
| CN | 201795237 U | 4/2011 |
| CN | 201851851 U | 6/2011 |
| TW | 200719793 A | 5/2007 |
| TW | 201233301 A | 8/2012 |
| TW | 201349987 A | 12/2013 |
| WO | 03/021408 A2 | 3/2003 |

\* cited by examiner

PORTABLE ELECTRONIC DEVICE

RELATED APPLICATIONS

This application claims priority to Taiwan Application Serial Number 103100084, filed Jan. 2, 2014 the entirety of which is herein incorporated by reference.

BACKGROUND

1. Field of Disclosure

The present disclosure relates to a portable electronic device. More particularly, the present disclosure relates to a portable electronic device with an adjustable viewing angle.

2. Description of Related Art

A conventional portable electronic device, for example, a convertible computer, includes a main body, a cover covered on the main body, and a four-bar linkage mechanism arranged between the main body and the cover. The four-bar linkage mechanism comprises two support members disposed between the main body and the cover in which two opposite ends of each of the support members are rotatably disposed on the main body and the cover, respectively. When the cover is opened on the main body, the cover moves the support members to rotate relative to the main body, after which the cover gradually rotates to stand on the main body so that an obtuse included angle is formed between the cover and the main body.

Figure 1:
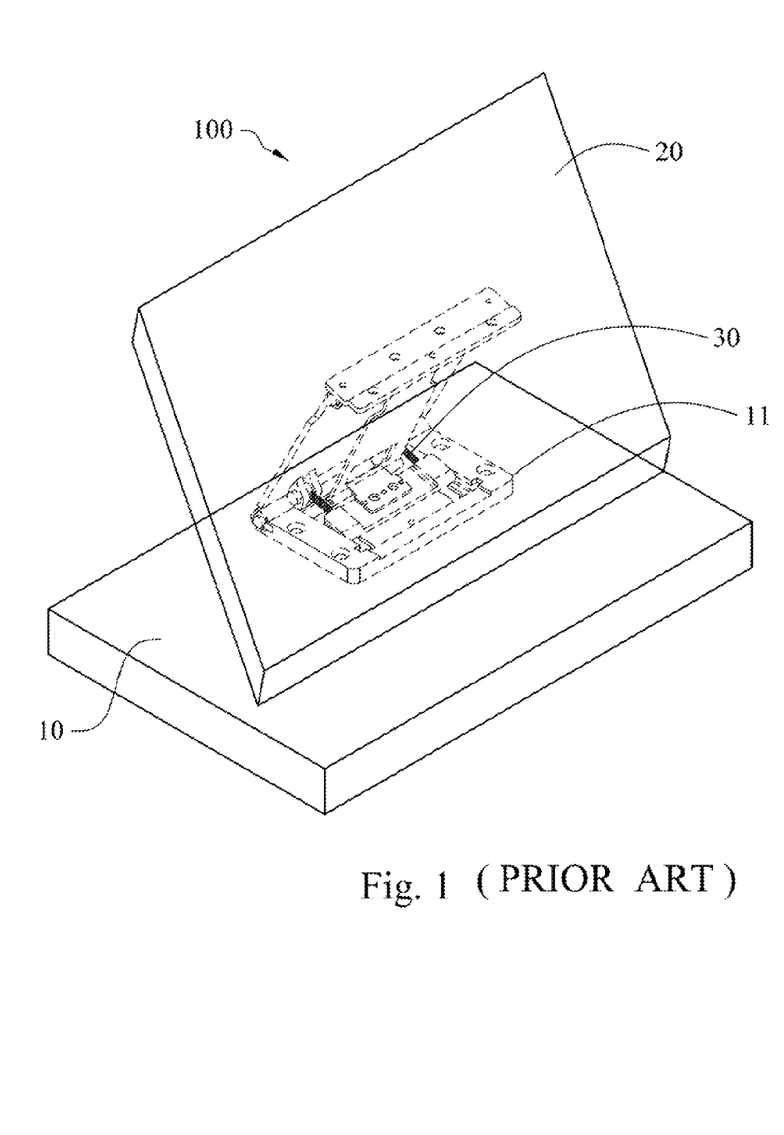
FIG. 1 is a schematic view of a conventional electronic device.

An example prior art electronic device is disclosed in Taiwanese patent publication number TW 201233301, published on Aug. 1, 2012. FIG. 1 is a schematic view of a conventional electronic device, and FIG. 2 is a perspective view of a linking mechanism of the conventional electronic device, in which FIG. 1 and FIG. 2 are respectively the same as FIG. 1 and FIG. 2 found in the prior art publication TW 201233301.

Figure 2:
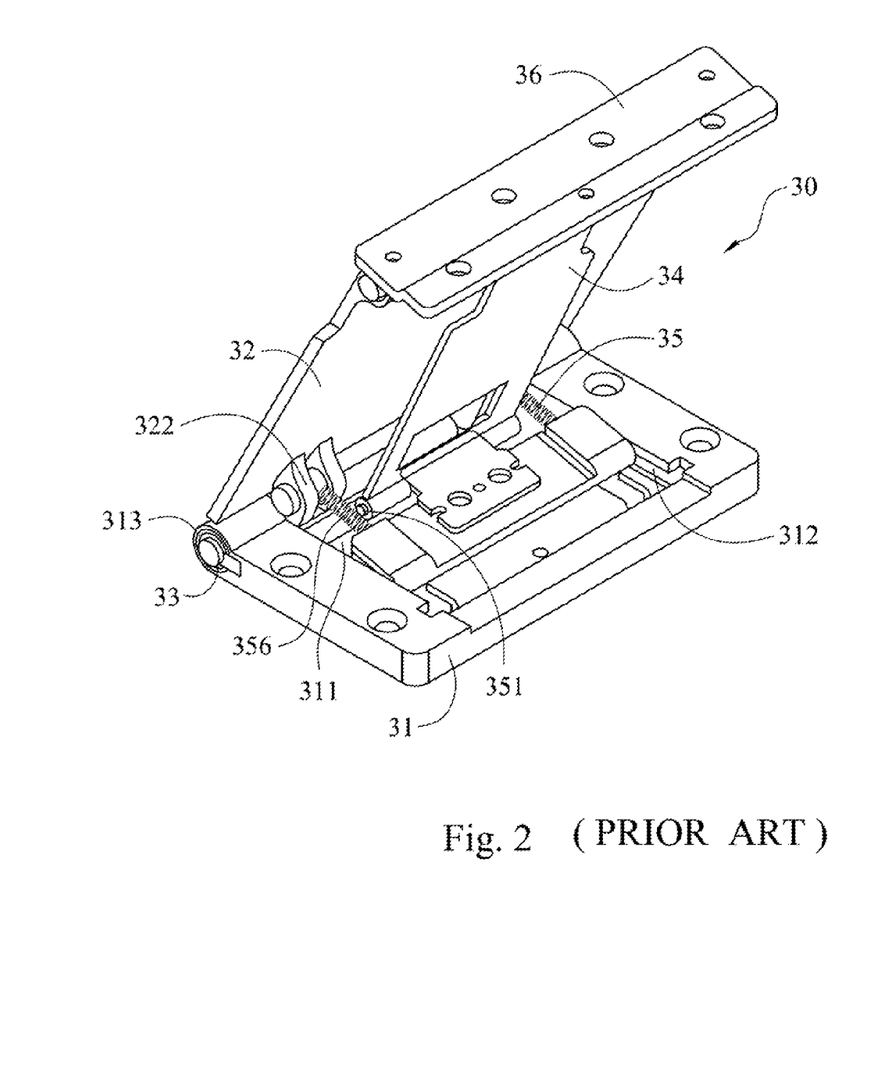
FIG. 2 is a perspective view of a linking mechanism of the conventional electronic device.

Referring to FIG. 1 and FIG. 2, the electronic device 100 includes a main body 10, a cover 20 and a linkage mechanism 30 connected to the main body 10 and the cover 20. The cover 20 can be a display screen which is slidable on the main body 10 to form an obtuse included angle between the cover 20 and the main body 10. The main body 10 is formed with a recess portion 11 for receiving the linkage mechanism 30. The linkage mechanism 30 is a four-bar linkage mechanism disposed between the cover 20 and the main body 10 so as to enable the display screen (i.e., the cover 20)to slide, lift or open relative to the main body 10. The linkage mechanism 30 includes a support member 32 and an adjusting member 34 which are disposed in this order. The linkage mechanism 30 further includes an elastic module 35. Two ends of the support member 32 are respectively rotatably connected to the main body 10 and the cover 20. One end of the adjusting member 34 is rotatably connected to the cover 20, and the other end of the adjusting member 34 is movably connected to the main body 10 through the elastic module 35. When the cover 20 rotates relative to the main body 10, the cover 20 pushes the support member 32 and the adjusting member 34 to rotate relative to the main body 10, and the adjusting member 34 moves relative to the main body 10 through the elastic module 35.

However, when there is a manufacturing error in the length of the support member 32 or the adjusting member 34, due to the presence of the elastic module 35 of the linkage mechanism 30, the adjusting member 34 can be moved relative to the main body 10 by pushing or pulling against the elastic module 35 so as to overcome problems associated with the opening angle of the cover 20 which would prevent the cover 20 from completely covering the main body 10.

However, after the cover 20 is opened into a final position, since the moving range of the adjusting member 34 is limited, the adjusting member 34 is unable to further rotate backwardly along with the support member 32 so that the viewing angle of the display screen for users cannot be adjusted and other selections of the viewing angles thereof cannot be provided.

As is evident from the above, the aforementioned conventional electronic device still has disadvantages. Therefore, those of ordinary skill in the art are endeavoring to seek ways in which to effectively overcome such disadvantages.

SUMMARY

In view of the above, one aspect of the present disclosure is to provide a portable electronic device for overcoming the above-mentioned disadvantages existing in the prior art.

According to an embodiment, a portable electronic device includes a cover, a main body, a first bracket and a second bracket. The main body comprises a top surface, a bottom surface opposite to the top surface, and a guiding groove disposed on the top surface in which the guiding groove includes a first distal end and a second distal end opposite to the first distal end. The first bracket includes two opposite ends. One end of the first bracket is pivotally connected to the cover, and the other end of the first bracket is slidably disposed in the guiding groove. The second bracket includes two opposite ends. One end of the second bracket is pivotally connected to the cover, and the other end of the second bracket is pivotally connected to the main body. When the cover pushes the first bracket to slide in the guiding groove, a first included angle is defined between the cover and the main body. After the first bracket is slid to the first distal end of the guiding groove, and the cover continues to push the first bracket and the second bracket to rotate simultaneously, a second included angle is defined between the cover and the main body which is greater than the first included angle.

Thus, the present disclosure provides a portable electronic device. After the cover is completely opened to a ready position, the cover can still be pushed backwards to adjust to a larger viewing angle so as to allow a user to choose a comfortable and suitable viewing angle of the portable electronic device.

The present disclosure also provides a portable electronic device for exposing a larger area of the main body so as to provide a full-standard user interface thereon and increase the convenience of operation and satisfaction of users.

According to one or more embodiments, the portable electronic device further comprises a rotary shaft. The rotary shaft is pivotally connected to the main body and the other of the opposite ends of the second bracket, so as to allow the second bracket to rotate about an axis of rotation relative to the main body. Also, an orthographic projection of the guiding groove on the bottom surface of the main body and an orthographic projection of the rotary shaft on the bottom surface of the main body are overlapped with each other.

According to one or more embodiments, an orthographic projection of the first distal end of the guiding groove on the bottom surface of the main body and an orthographic projection of the rotary shaft on the bottom surface of the main body are overlapped with each other.

According to one or more embodiments, the rotary shaft is a torque rotary shaft, and a damper is installed in the torque rotary.

According to one or more embodiments, the main body comprises a front-end portion and a back-end portion which are opposite to each other. Both of the first distal end of the guiding groove and the rotary shaft are disposed on the back-end portion of the main body.

According to one or more embodiments, the first distal end of the guiding groove and the second distal end of the guiding groove are non-coplanar. The first distal end of the guiding groove departing away from the bottom surface of the main body is farther than the second distal end of the guiding groove departing away from the bottom surface of the main body.

According to one or more embodiments, the guiding groove gradually departs away from the bottom surface of the main body in one direction extended from the front-end portion of the main body towards the back-end portion thereof.

According to one or more embodiments, the guiding groove is linearly shaped or arc-shaped.

According to another embodiment of the disclosure, the portable electronic device includes a cover, a main body, a first bracket, a second bracket and a rotary shaft. The main body includes a top surface, a bottom surface opposite to the top surface, and a guiding groove disposed on the top surface thereof. The first bracket includes two opposite ends in which one of the opposite ends of the first bracket is pivotally connected to the cover, and the other of the opposite ends of the first bracket is slidable in the guiding groove. The second bracket includes two opposite ends in which one of the opposite ends of the second bracket is pivotally connected to the cover. The rotary shaft is pivotally connected to the other of the opposite ends of the second bracket and the main body so as to allow the second bracket to rotate about an axis of rotation relative to the main body. An orthographic projection of the guiding groove on the bottom surface of the main body and an orthographic projection of the rotary shaft on the bottom surface of the main body are overlapped with each other.

The above description is merely used for illustrating the problems to be resolved, the technical methods for resolving the problems and their efficacies, etc. The specific details of the present disclosure will be explained in the embodiments below and related drawings.

BRIEF DESCRIPTION OF THE DRAWINGS

The disclosure may be more fully understood by reading the following detailed description of the embodiment, with reference made to the accompanying drawings as follows.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the drawings, some of the conventional structures and elements are shown with schematic illustrations.

Because the adjusting member of the prior art described above is unable to further rotate backwardly along with the support member, the viewing angle of the display screen for users cannot be further expanded, thereby resulting in limitations with respect to the different viewing angles of the display screen that can be realized. In a portable electronic device according to an embodiment of the disclosure, after a cover of the portable electronic device is completely opened to a ready position, the cover still can be further pushed backwards to expand the viewing angle so as to allow users to choose a comfortable and suitable viewing angle of the portable electronic device. Thus, compared to the prior art, the disclosure of the portable electronic device provides better solutions in connection with the needs of users.

Figure 3:
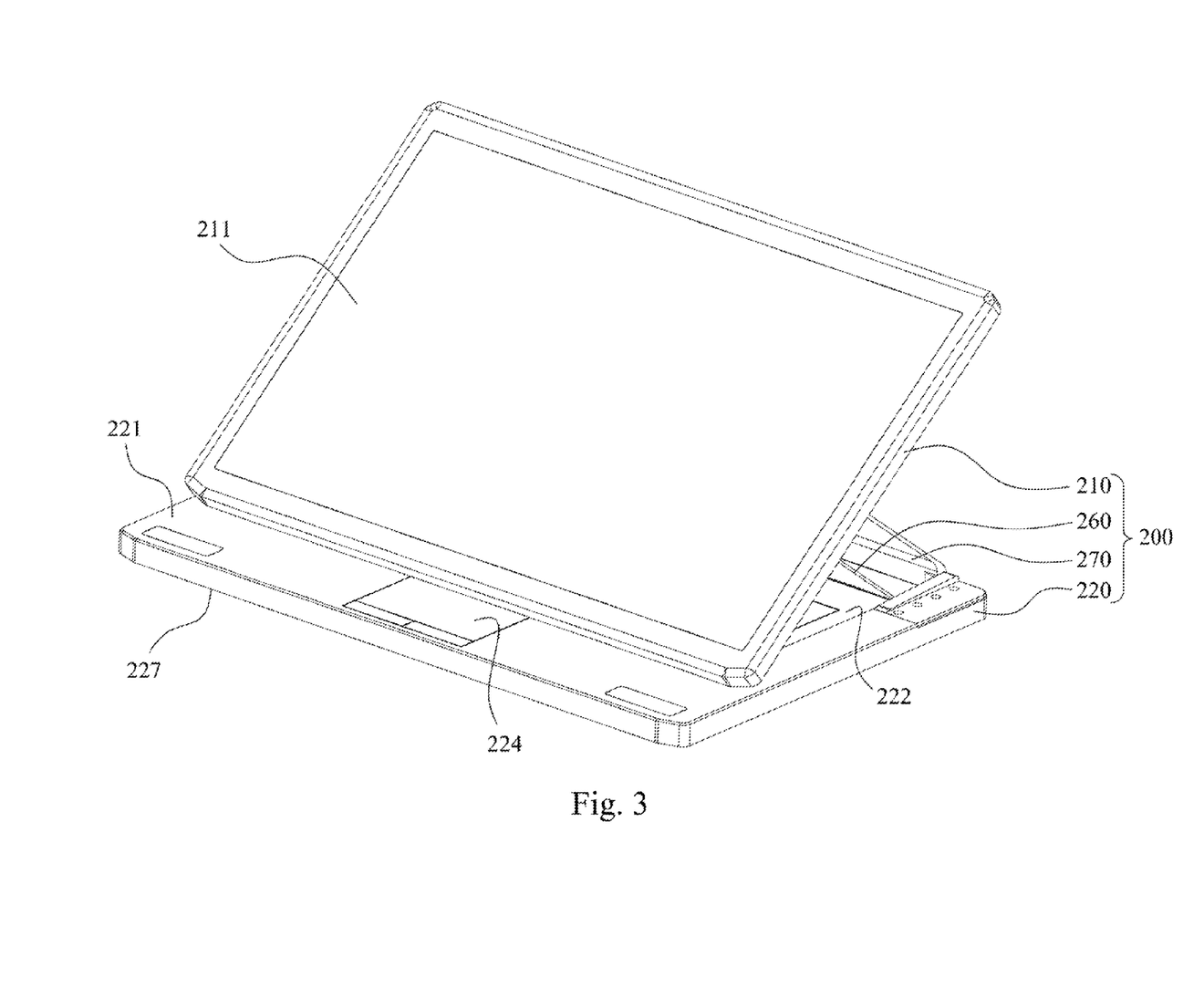
FIG. 3 is a perspective view of a portable electronic device according to an embodiment of the disclosure.
Figure 4A:
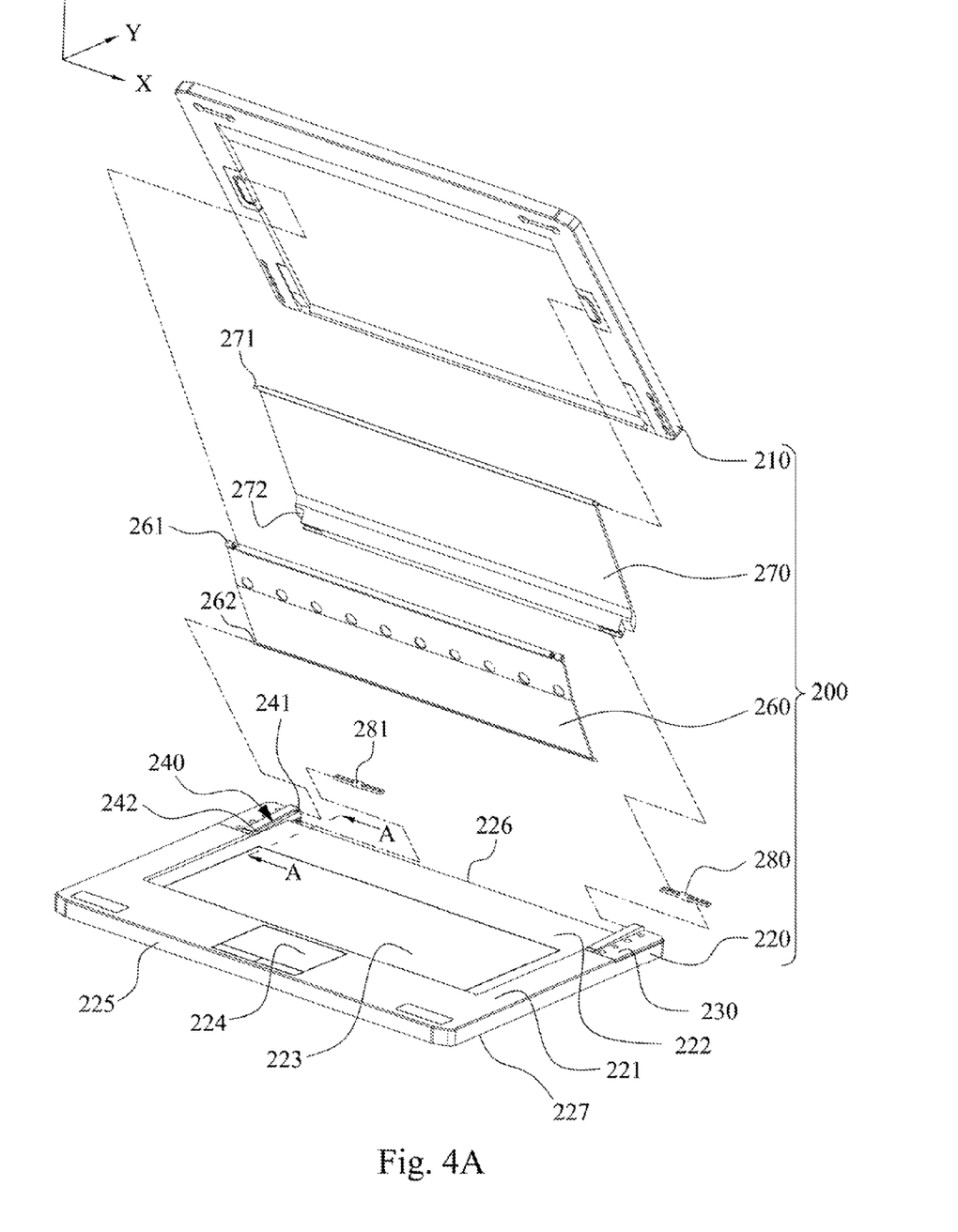
FIG. 4A is an exploded schematic view of FIG. 3.

Reference is now made to FIG. 3 and FIG. 4A, in which FIG. 3 is a perspective view of a portable electronic device 200 according to an embodiment of the disclosure, and FIG. 4A is an exploded schematic view of FIG. 3. As shown in FIG. 3 and FIG. 4A, the portable electronic device 200 includes a cover 210, a main body 220, a first bracket 260, a second bracket 270 and at least one rotary shaft 280. The main body 220 includes a top surface 221, a bottom surface 227 and at least one guiding groove 240. The top surface 221 and the bottom surface 227 are opposite to each other. The guiding groove 240 is formed on the top surface 224 of the main body 220, and the guiding groove 240 includes a first distal end 241 and a second distal end 242 which are opposite to each other. The first bracket 260 includes a first end 261 and a second end 262 which are opposite to each other, and the first end 261 of the first bracket 260 is pivotally connected to the cover 210, and the second end 262 of the first bracket 260 is slidably disposed in the guiding groove 240. The second bracket 270 includes a third end 271 and a fourth end 272 which are opposite to each other, and the third end 271 of the second bracket 270 is pivotally connected to the cover 210, and the fourth end 272 of the second bracket 270 is pivotally connected to the main body 220. The rotary shaft 280 is disposed between the top surface 221 and the bottom surface 227 of the main body 220, and pivotally connected to the fourth end 272 of the second bracket 270 and the main body 220 so as to allow the second bracket 270 to rotate about an axis of rotation relative to the main body 220, in which the axis of rotation of the second bracket 270 is along the X-axis direction.

Figure 4B:
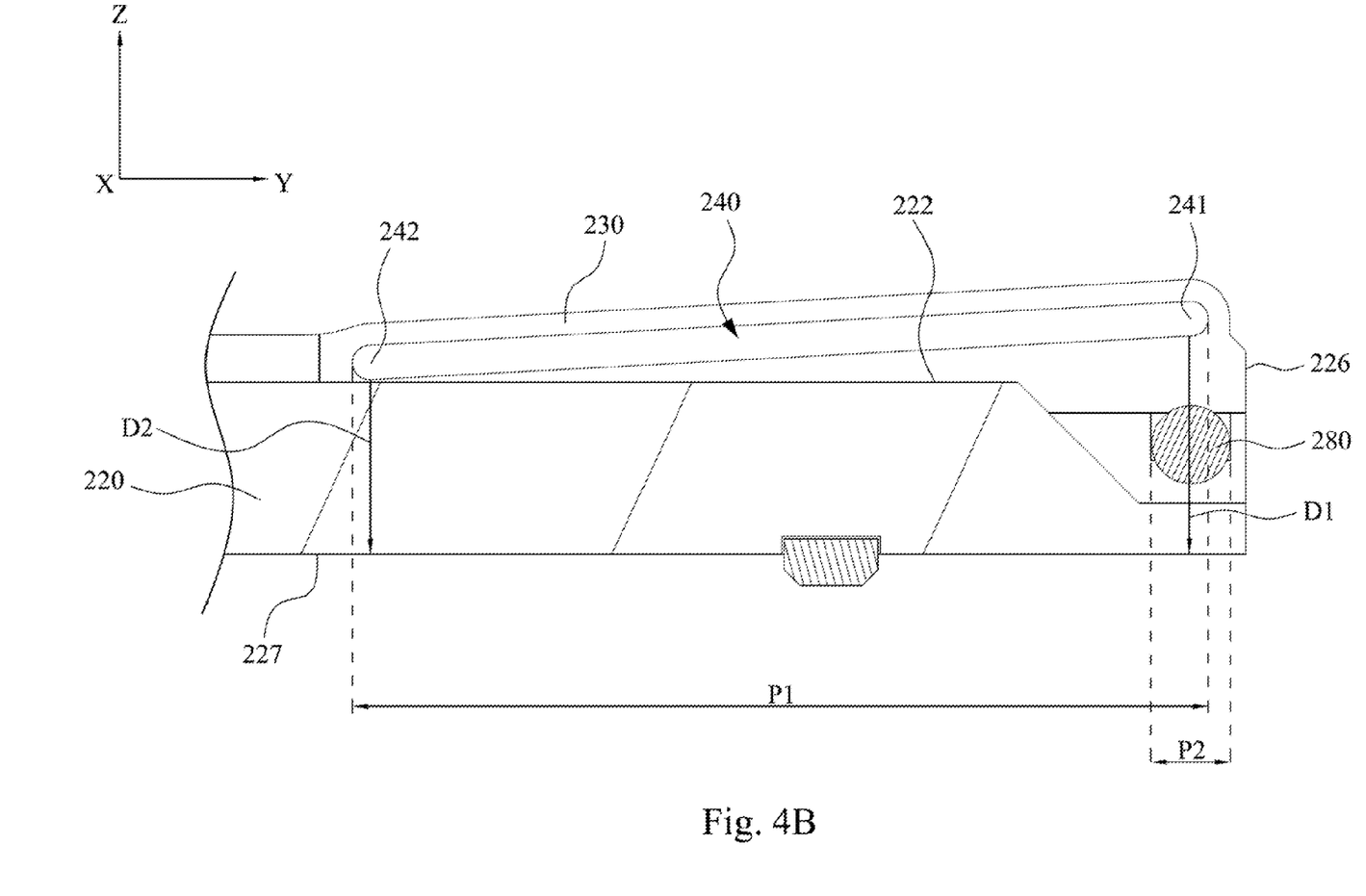
FIG. 4B is a cross-sectional view of FIG. 4A taken along line A-A.

FIG. 4B is a cross-sectional view of FIG. 4A taken along line A-A. As shown in FIG. 4B, the guiding groove 240 is extended over the rotary shaft 280. That is, an orthographic projection P1 of the guiding groove 240 projected on the bottom surface 227 of the main body 220 and an orthographic projection P2 of the rotary shaft 280 projected on the bottom surface 227 of the main body 220 are at least partially overlapped with each other. More specifically, an orthographic projection of the first distal end 241 of the guiding groove 240 projected on the bottom surface 227 of the main body 220 and the orthographic projection P2 of the rotary shaft 280 projected on the bottom surface 227 of the main body 220 are overlapped with each other.

A description of changing the portable electronic device 200 from an open position from a closed position in sequence will now be provided with reference to FIG. 5A to FIG. 5D.

Figure 5A:
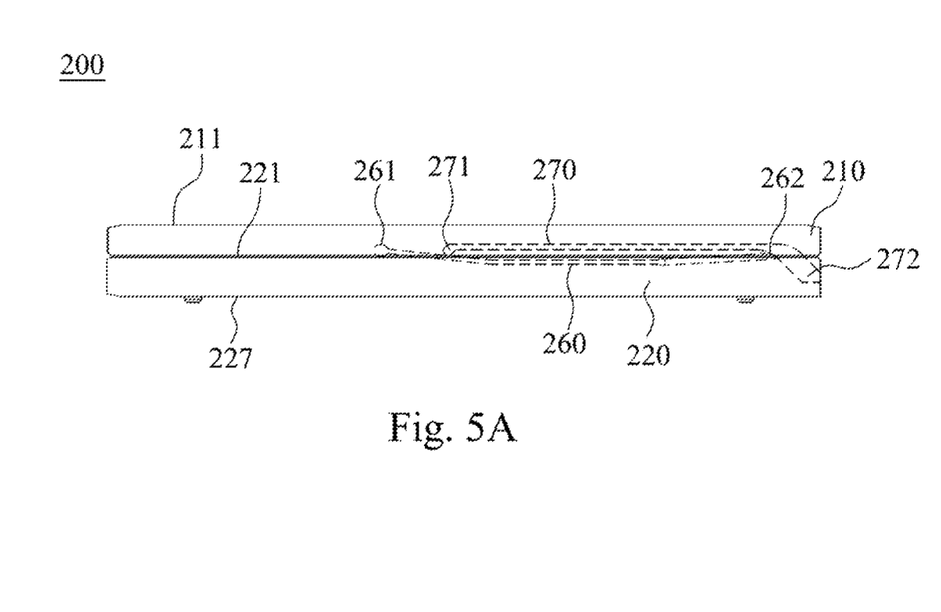
FIG. 5A is a side view of the portable electronic device in a closed position according to the embodiment of the disclosure.

FIG. 5A is a side view of the portable electronic device 200 in a closed position according to the embodiment of the disclosure. In the closed position, the cover 210 is overlapped with the main body 220. The first bracket 260 and the second bracket 270 are overlapped with each other, and interposed between the cover 210 and the main body 220. The second end 262 of the first bracket 260 is located at the second distal end 242 of the guiding groove 240 (not shown in these drawings). At the same time, when a surface of the cover 210 is provided with a display screen 211 thereon, the display screen 211 of the cover 210 faces upwardly and away from the top surface 221 of the main body 220 so that the user of the portable electronic device 200 can use the portable electronic device 200 as a tablet computer.

Figure 5B:
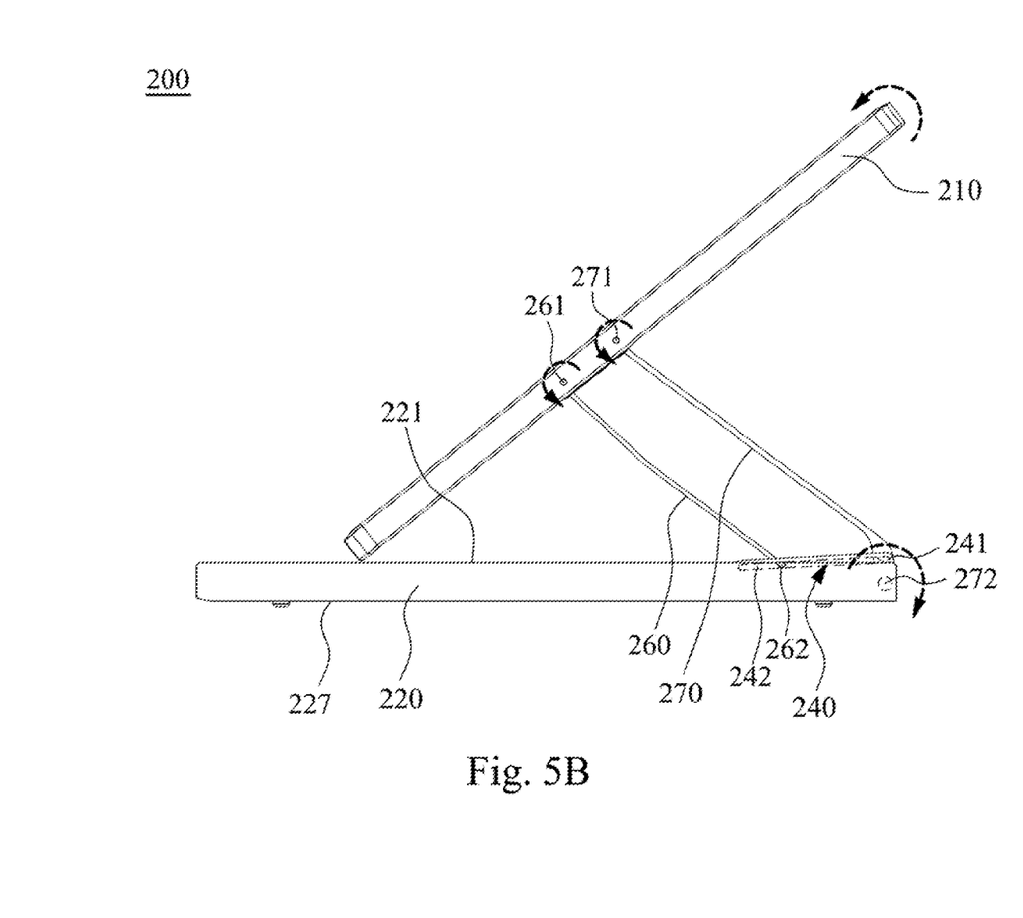
FIG. 5B is a side view of the portable electronic device in an open position according to the embodiment of the disclosure.

FIG. 5B is a side view of the portable electronic device 200 in an open position according to the embodiment of the disclosure. When a user starts to move the cover 210 to depart from the top surface 221 of the main body 220, the cover 210 pushes the first bracket 260 and the second bracket 270 to depart from the top surface 221 of the main body 220. Thus, at this moment, the first end 261 of the first bracket 260 and the third end 271 of the second bracket 270 are rotated relative to the cover 210 together, the fourth end 272 of the second bracket 270 is rotated relative to the main body 220, and the second end 262 of the first bracket 260 is slid in the guiding groove 240 from the second distal end 242 towards the first distal end 241.

Figure 5C:
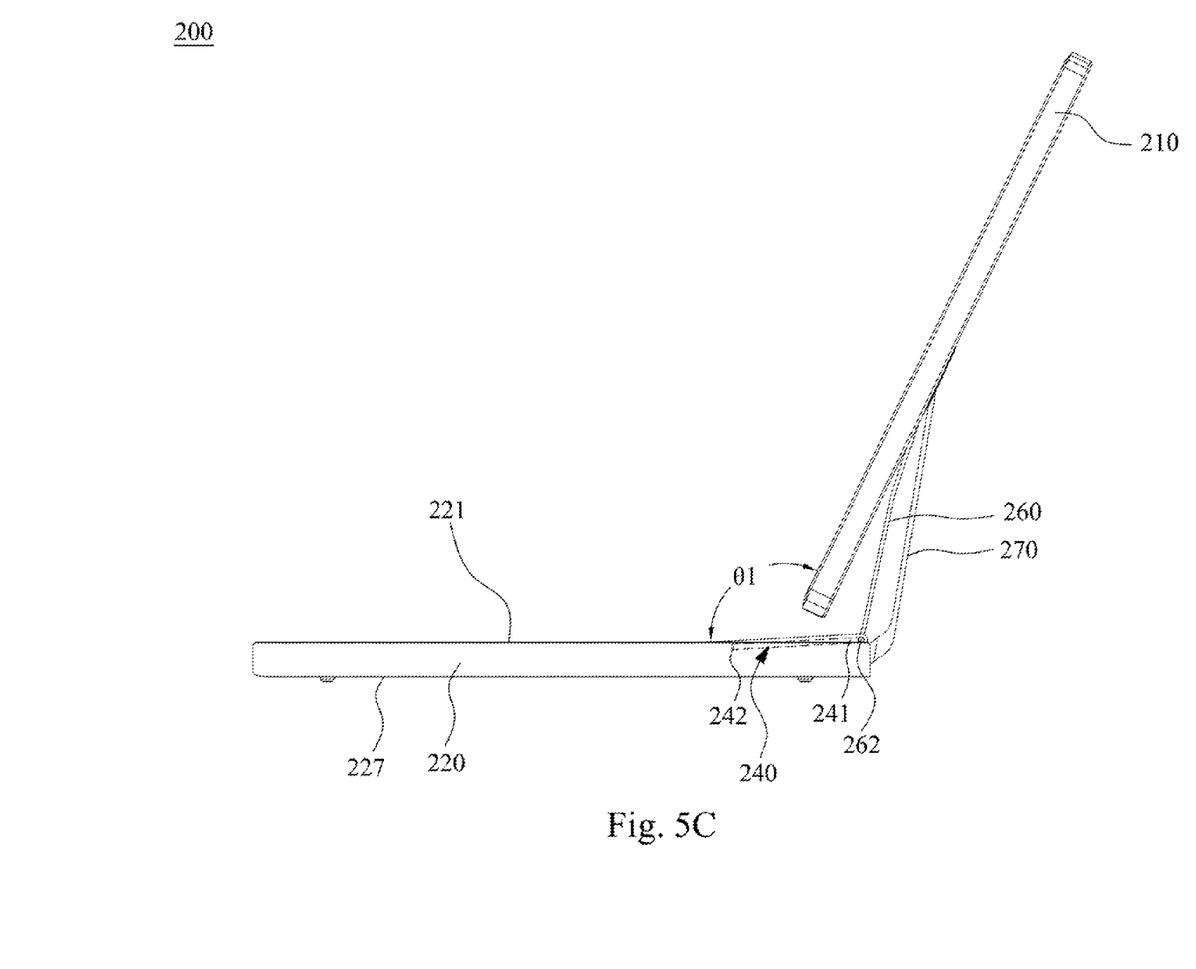
FIG. 5C is a side view of a cover of the portable electronic device in a state completely opened to a stable position from a main body thereof according to the embodiment of the disclosure.

FIG. 5C is a side view of the cover 210 of the portable electronic device 200 in a state completely opened to a stable position on the main body 220 thereof according to the embodiment of the disclosure. Referring to FIG. 5B and FIG. 5C, when the cover 210 pushes the first bracket 260 to move the second end 262 of the first bracket 260 to any location between the first distal end 241 and the second distal end 242 of the guiding groove 240, including to the first distal end 241, for adjusting the viewing angle of the portable electronic device 200, a first included angle θ1 (FIG. 5C) is formed between the cover 210 and the main body 220. Thus, the user of the portable electronic device 200 can use the portable electronic device 200 as a notebook computer. Furthermore, in FIG. 5C, when the cover 210 pushes the first bracket 260 to move the second end 262 of the first bracket 260 to the first distal end 241 of the guiding groove 240, the cover 210 is completely opened to a stable position on the main body 220.

Figure 5D:
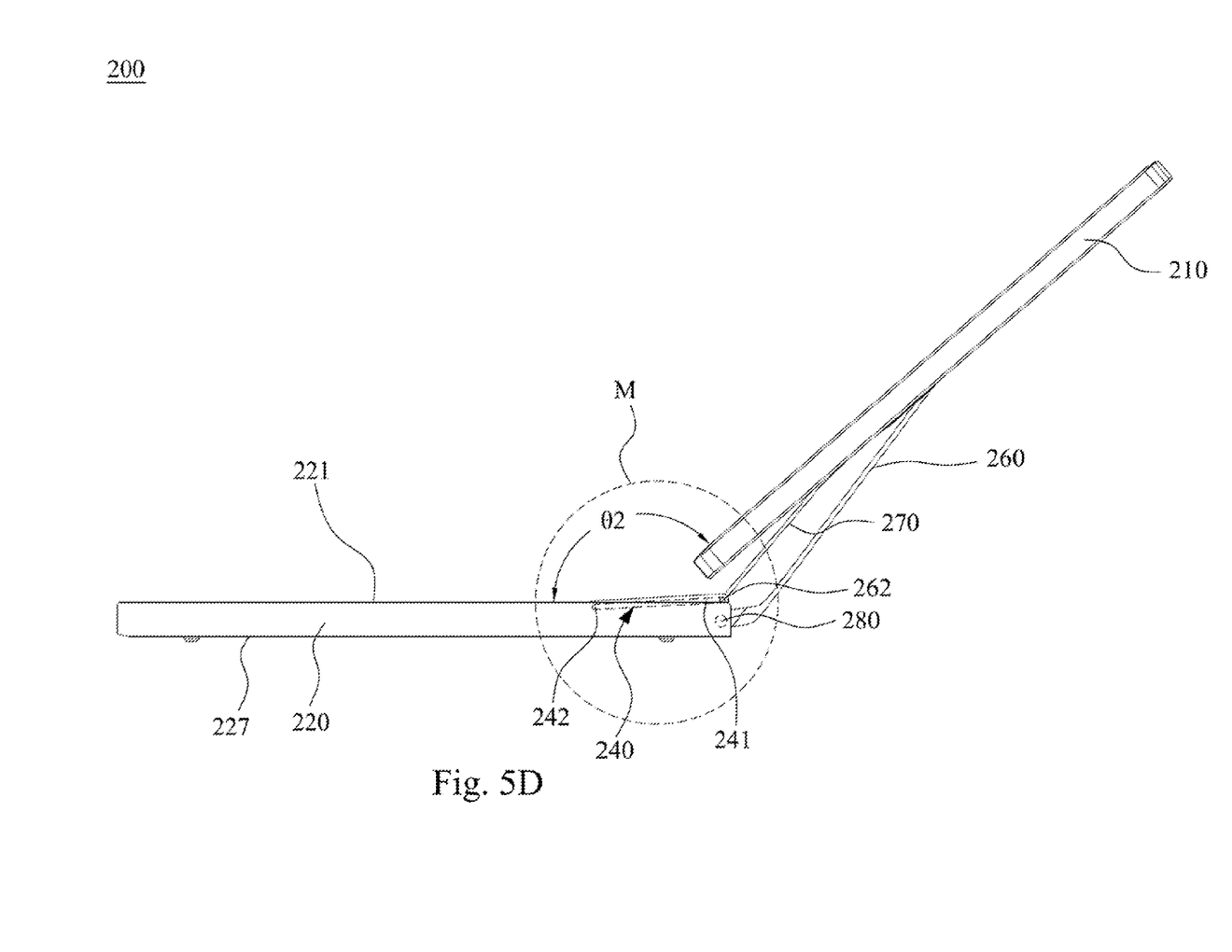
FIG. 5D is a side view of the cover of the portable electronic device in a state continually rotated backwards from the stable position according to the embodiment of the disclosure.

It is to be noted that the user can slightly rotate the cover 210 to select one of a plurality of viewing angles (i.e., the included angle defined between the cover 210 and the main body 220, such as the first included angle θ1) in the open position. FIG. 5D is a side view of the cover 210 of the portable electronic device 200 in a state continually rotated backwards from the stable position according to the embodiment of the disclosure. Since the second end 262 of the first bracket 260 in this state is located over the rotary shaft 280, by pushing the cover 210 of the portable electronic device 200 to continually rotate the first bracket 260 and the second bracket 270 backwards together in a direction away from the main body 220, the cover 210 of the portable electronic device 200 can be continually rotated backwards to provide a larger viewing angle, that is, a second included angle θ2 is defined between the cover 210 and the main body 220 and is greater than the first included angle θ1 so as to allow the user to choose a suitable viewing angle of the portable electronic device 200 from the steady position.

Referring back to FIG. 4A, in the embodiment, the portable electronic device 200 can be, for example, a tablet computer or a notebook computer. When the portable electronic device 200 is a notebook computer, the main body 220 is a computer mainframe. For instance, the computer mainframe at least includes a motherboard, a central processing unit, a memory unit, a hard disk, a battery unit, and plural electronic components for processing commands. The top surface 221 of the main body 220 is further provided with an operating face 222 that is indented inwardly. The operating face 222 is at least provided with a keyboard 223. Also, the top surface 221 of the main body 220 is further provided with a touch pad interface 224. The aforementioned display screen 211, for example, is a touch-controlled display screen, and the touch-controlled display screen includes a touch-controlled surface and a rear surface which are opposite to each other. The user can control the portable electronic device 200 by the touch-controlled surface. The rotary shaft 280, for example, is a torque rotary shaft used in a typical notebook computer. Since the rotary shaft 280 is installed with a damper 281 therein for holding the second bracket 270, the second bracket 270 will not be inadvertently rotated by the cover 210. However, the present disclosure is not limited thereto.

In the embodiment, specifically, the main body 220 is in the shape of a board, and includes a front-end portion 225 and a back-end portion 226 which are arranged on opposite sides along a lengthwise direction of the main body 220. Compared to the back-end portion 226 of the main body 220, the front-end portion 225 of the main body 220 is closer to the touch pad interface 224. The top surface 221 and the bottom surface 227 of the main body 220 are respectively arranged on top and bottom areas of the main body 220, and each of the top surface 221 and the bottom surface 227 is disposed between the front-end portion 225 and the back-end portion 226.

Refer to FIG. 4A and FIG. 4B, the main body 220 further includes two external inserted blocks 230. The external inserted blocks 230 are symmetrically inserted on the top surface 221 of the main body 220, and are connected to the back-end portion 226 of the main body 220, or connected roughly to the back-end portion 226. If the external inserted blocks 230 are close to the back-end portion 226 (FIG. 4B) this is deemed equivalent herein to stating that the external inserted blocks 230 are connected to the back-end portion 226 of the main body 220.

When the quantity of the guiding groove 240 is two, the guiding grooves 240 are respectively formed on two opposite surfaces of the external inserted blocks 230 which face each other, and the operating face 222 is disposed between the external inserted blocks 230. Each of the guiding grooves 240 is linear in shape, and extended in a direction from the front-end portion 225 towards the back-end portion 226 thereof. The first distal end 241 of the guiding groove 240 is further extended to the back-end portion 226 of the main body 220, or at least extended roughly to the back-end portion 226 of the main body 220. If the first distal end 241 of the guiding groove 240 is close to the back-end portion 226 (FIG. 4B), this is deemed equivalent herein to stating that the first distal end 241 of the guiding groove 240 is disposed on the back-end portion 226 of the main body 220.

In the embodiment, although the guiding groove 240 is formed on the external inserted block 230 before the external inserted block 230 is fixed on the main body 220 using screws, the disclosure is not limited in this respect and a person with ordinary skill in the art form the guiding groove directly on the top surface, depending on actual needs. Also a person with ordinary skill in the art might optionally select a direction of the guiding groove facing outwardly, depending on actual needs.

In this embodiment, referring to FIG. 4A and FIG. 4B, when the quantity of the rotary shaft 280 is two, the rotary shafts 280 are symmetrically disposed on the back-end portion 226. Each of the rotary shafts 280 is fixedly sandwiched between one of the external inserted blocks 230 and the main body 220. When the rotary shaft 280 is close to the back-end portion 226 (FIG. 4A), this is deemed equivalent herein to stating that the rotary shaft 280 is disposed on the back-end portion 226 of the main body 220.

In this embodiment, even though the first distal end 241 of the guiding groove 240 and the rotary shaft 280 are both disposed on the back-end portion 226 of the main body 220, the disclosure is not limited to the first distal end 241 of the guiding groove 240 and the rotary shaft 280 being disposed on the back-end portion 226, as long as the first distal end 241 of the guiding groove 240 is at least partially overlapped with the rotary shaft 28 along a vertical longitudinal axis (i.e., Z-axis)so that the cover 210 can continually push the first bracket 260 and the second bracket 270 to rotate backwards together in the direction away from the main body 220.

Furthermore, in order to assist the second end 262 of the first bracket 260 to smoothly slide to the first distal end 241 of the guiding groove 240, as shown in FIG. 4B, the first distal end 241 of the guiding groove 240 and the second distal end 242 of the guiding groove 240 are non-coplanar, and a maximum linear distance D1 defined between the first distal end 241 of the guiding groove 240 and the bottom surface 227 of the main body 220 is greater than a maximum linear distance D2 defined between the second distal end 242 of the guiding groove 240 and the bottom surface 227 of the main body 220. That is, the first distal end 241 of the guiding groove 240 departing away from the bottom surface 227 of the main body 220 is farther than the second distal end 242 of the guiding groove 240 departing away from the bottom surface 227 of the main body 220.

Furthermore, referring to FIG. 4B, the guiding groove 240 gradually rises along the vertical longitudinal axis (i.e., Z-axis) in one direction extended from the front-end portion 225 of the main body 220 towards the back-end portion 226 thereof. That is, the guiding groove 240 gradually departs away from the bottom surface 227 of the main body 220 in one direction extended from the front-end portion 225 of the main body 220 towards the back-end portion 226 thereof.

Figure 6:
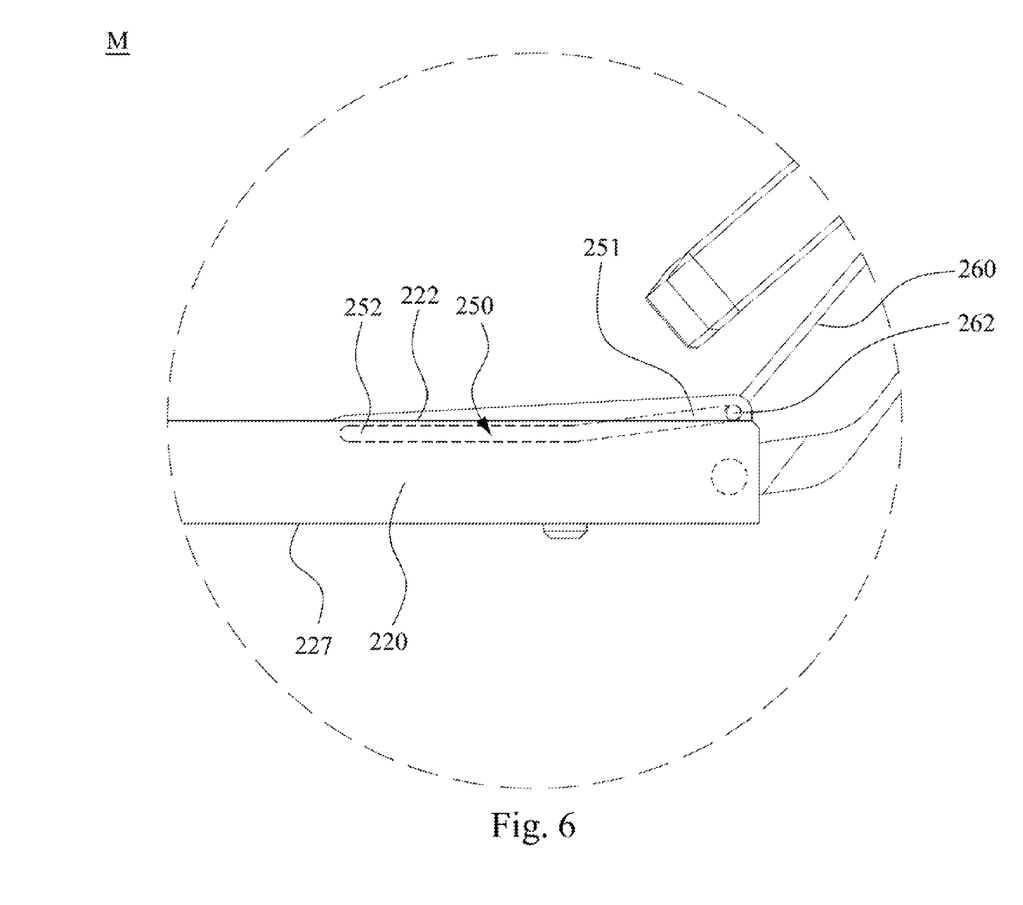
FIG. 6 is a partially enlarged view of a portable electronic device according to another embodiment of the disclosure, in which the enlarged location is same as an area M of FIG. 5D.

In the embodiment, referring to FIG. 4A, although the guiding groove 240 is straight and is gradually inclined towards both the cover 210 and the back-end portion 226, the disclosure is not limited thereto. In order to assist the first end 261 of the first bracket 260 to rotate relative to the main body 220 (FIG. 4A) such that the second end 262 of the first bracket 260 can more smoothly slide to the first distal end 241 of the guiding groove 240, in another embodiment, referring to FIG. 6 which is a partially enlarged view of a portable electronic device according to another embodiment of the disclosure, in which the enlarged location is same as an area M of FIG. 5D, the guiding groove 250 is in an arc shape, and more particularly, an area of the guiding groove 250 neighboring the second distal end 252 is in a linear shape, and another area of the guiding groove 250 neighboring the first distal end 251 is in an arc shape. Hence, the closer the second end 262 of the first bracket 260 is to the first distal end 251 of the guiding groove 250, the farther the second end 262 of the first bracket 260 departs away from the operating face 222 on the arc shaped guiding groove 250.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A portable electronic device, comprising:
    a cover;
    a main body comprising a first recess a second recess, a front-end portion, a back-end portion opposite to the front-end portion, a top surface, a bottom surface opposite to the top surface, wherein the back-end portion is arranged between the top surface and the bottom surface, the first recess is formed on the top surface, and connected to the back-end portion, and the second recess is formed on a bottom surface of the first recess;
    an external inserted block inserted in the first recess, and covering the second recess to mutually define a rotary hole with the external inserted block, the external inserted block comprising a guiding groove disposed on the external inserted block and located above the rotary hole, wherein the guiding groove is provided with a first distal end and a second distal end opposite to the first distal end;
    a first bracket comprising two opposite ends, one of the opposite ends of the first bracket being pivotally connected to the cover, and the other of the opposite ends of the first bracket being slidably disposed in the guiding groove;
    a second bracket comprising two opposite ends, one of the opposite ends of the second bracket being pivotally connected to the cover, and the other of the opposite ends of the second bracket being pivotally connected to the main body; and
    a rotary shaft pivotally connected to the main body and the other of the opposite ends of the second bracket so as to allow the second bracket to rotate about an axis of rotation relative to the main body, wherein the rotary shaft pivotally inserts in the rotary hole, an orthographic projection of the guiding groove on the bottom surface of the main body and an orthographic projection of the rotary shaft on the bottom surface of the main body are overlapped with each other;
    wherein, when the cover pushes the first bracket to slide in the guiding groove, a first included angle is defined between the cover and the main body, after the first bracket is slid to the first distal end of the guiding groove, and the cover continues to push the first bracket and the second bracket to rotate simultaneously, a second included angle is defined between the cover and the main body which is greater than the first included angle.

2. The portable electronic device of claim 1, wherein the rotary shaft is a torque rotary shaft having a damper therein.

3. The portable electronic device of claim 1, wherein an orthographic projection of the first distal end of the guiding groove on the bottom surface of the main body and an orthographic projection of the rotary shaft on the bottom surface of the main body are overlapped with each other.

4. The portable electronic device of claim 1, wherein the main body comprises a front-end portion and a back-end portion which are opposite to each other, and both of the first distal end of the guiding groove and the rotary shaft are disposed on the back-end portion of the main body.

5. The portable electronic device of claim 4, wherein the first distal end of the guiding groove and the second distal end of the guiding groove are non-coplanar, and the first distal end of the guiding groove departing away from the bottom surface of the main body is farther than the second distal end of the guiding groove departing away from the bottom surface of the main body.

6. The portable electronic device of claim 1, wherein the guiding groove departs gradually away from the bottom surface of the main body in one direction extended from the front-end portion of the main body towards the back-end portion thereof.

7. The portable electronic device of claim 1, wherein the guiding groove is linearly shape or arc-shaped.

8. A portable electronic device, comprising:
a cover;
a main body having a first recess, a second recess, a front-end portion, a back-end portion opposite to the front-end portion, a top surface, and a bottom surface opposite to the top surface, wherein the back-end portion is arranged between the top surface and the bottom surface, the first recess is formed on the top surface and connected to the back-end portion, and the second recess is formed on a bottom surface of the first recess;
an external inserted block inserted in the first recess, and covering the second recess to mutually define a rotary hole with the external inserted block, the external inserted block comprising a guiding groove disposed on the external inserted block and located above the rotary hole, wherein the guiding groove is provided with a first distal end and a second distal end opposite to the first distal end;
a first bracket having two opposite ends, one of the opposite ends of the first bracket pivotally being connected to the cover, and the other of the opposite ends of the first bracket being slidably disposed in the guiding groove;
a second bracket having two opposite ends, one of the opposite ends of the second bracket being pivotally connected to the cover; and
a rotary shaft pivotally connected to the other of the opposite ends of the second bracket and the main body so as to allow the second bracket to rotate about an axis of rotation relative to the main body, wherein the rotary shaft pivotally inserts in the rotary hole,
wherein an orthographic projection of the guiding groove on the bottom surface of the main body and an orthographic projection of the rotary shaft on the bottom surface of the main body are overlapped with each other.

9. The portable electronic device of claim 8, wherein the guiding groove comprises a first distal end and a second distal end opposite to the first distal end, and an orthographic projection of the first distal end of the guiding groove on the bottom surface of the main body and an orthographic projection of the rotary shaft on the bottom surface of the main body are overlapped with each other.

10. The portable electronic device of claim 8, wherein the rotary shaft is a torque rotary shaft having a damper therein.

11. The portable electronic device of claim 8, wherein the guiding groove is linearly shape or arc-shaped.

12. The portable electronic device of claim 9, wherein the main body comprises a front-end portion and a back-end portion which are opposite to each other, and both of the first distal end of the guiding groove and the rotary shaft are disposed on the back-end portion of the main body.

13. The portable electronic device of claim 12, wherein the first distal end of the guiding groove and the second distal end of the guiding groove are non-coplanar, and the first distal end of the guiding groove departing away from the bottom surface of the main body is farther than the second distal end of the guiding groove departing away from the bottom surface of the main body.

14. The portable electronic device of claim 13, wherein the guiding groove gradually departs away from the bottom surface of the main body in one direction extended from the front-end portion of the main body towards the back-end portion thereof.

* * * * *